United States Patent [19]

Cooper et al.

[11] Patent Number: 5,242,677
[45] Date of Patent: Sep. 7, 1993

[54] STABLE ZEOLITE OF LOW UNIT CELL CONSTANT AND METHOD OF MAKING SAME

[75] Inventors: David A. Cooper, Morrisville; Raymond P. Denkewicz, East Norriton, both of Pa.; Elliot P. Hertzenberg, Wilmington, Del.

[73] Assignee: PQ Corporation, Valley Forge, Pa.

[21] Appl. No.: 897,146

[22] Filed: Jun. 11, 1992

[51] Int. Cl.$^5$ ............................................. C01B 33/34
[52] U.S. Cl. ........................... 423/714; 423/DIG. 21; 502/79; 502/85
[58] Field of Search ............... 423/328, 118, DIG. 21; 502/79, 85, 86

[56] References Cited

FOREIGN PATENT DOCUMENTS

| | | | |
|---|---|---|---|
| 88/03437 | 5/1988 | PCT Int'l Appl. | 502/79 |
| 89/03367 | 4/1989 | PCT Int'l Appl. | 423/328 |
| 2085861 | 5/1982 | United Kingdom | 502/79 |

OTHER PUBLICATIONS

Dempsey et al. "Variation of Lattice Parameter with Aluminum Content in Synthetic Sodium Faujasites. Evidence for Ordering of the Framework Ions", J. Phys. Chem. vol. 73, No. 2 1969 pp. 387–390.

*Primary Examiner*—R. Bruce Breneman
*Attorney, Agent, or Firm*—Ernest G. Posner

[57] ABSTRACT

Y-type zeolites with unit cell constants of less than 24.14 Å are prepared by improving the method of dealumination and aluminum ion exchange. Zeolites with such low unit cell constants have not been known previously.

5 Claims, No Drawings

STABLE ZEOLITE OF LOW UNIT CELL CONSTANT AND METHOD OF MAKING SAME

BACKGROUND OF THE INVENTION

This invention relates to a stabilized zeolite Y with a very low unit cell constant ($a_o$) made by a process involving the dealumination of zeolite Y and subsequent steps involving aluminum ion exchange, calcination, and acid treatment. In particular the zeolite Y product has an $a_o$ of less than 24.14 Å. Such low $a_o$ values are realized by imposing a previously unknown control on the dealumination and stabilization process.

Various forms of stabilized zeolite Y are used as supports for hydrocarbon conversion catalysts. Stabilized zeolite Y is formed by removing some of the alumina from the zeolite crystal structure (dealumination) through various hydrothermal and chemical processes. Dealumination is accompanied by shrinkage of the $a_o$ and removal of sodium.

A review of various dealumination methods and descriptions of the products produced is provided by Sherzer, "Catalysts Materials: Relationship Between Structure and Reactivity," ACS Symposium Series, ed. T. E. Whyte, Jr., et al, 248, 151 (1984). This reference shows highly dealuminated Y zeolites with $a_o$ values of 24.25 Å.

Dealuminated Y zeolites can be further treated by ion exchange with aluminum ions followed by steam calcination. International Patent Application PCT/SE87/0044 (International Publication Number: WO 89/003367) teaches such a method that results in zeolite Y materials with $a_o$ values as low as 24.15 Å.

It is an object of this invention to control the method of dealumination and stabilization of zeolite Y so that materials with $a_o$ values of 24.14 Å or less can be prepared.

SUMMARY OF THE INVENTION

The first step in the improved process of our invention is the ammonium exchange of zeolite Y. The exchanged material is steam calcined to provide hydrogen Y zeolite which is then ammonium exchanged to provide ultrastable Y zeolite. This material, known as USY, is ion exchanged with a solution containing aluminum ions and then steam calcined to provide a hydrogen aluminum Y zeolite. The aluminum exchange and the steam calcination must be controlled so that the hydrogen aluminum Y zeolite has an $a_o$ of 24.31 Å to 24.35 Å. This material must then be treated with a strong mineral acid to provide our novel product, a Y-type zeolite of high $SiO_2/Al_2O_3$ ratio and an $a_o$ of 24.09 to 24.14 Å.

The preparation of a Y zeolite with such a low $a_o$ is surprising, since such materials have not been prepared previously. The need to control the $a_o$ of the intermediate product from 24.31 to 24.35 is also surprising, especially since the acid treatment of zeolites with $a_o$ values of less than 24.31 result in products with $a_o$ values in excess of 24.15 Å.

THE INVENTION

Zeolite Y (often abbreviated NaY) is the starting material for the process of our invention. It is an article of commerce prepared by the hydrothermal treatment of sources of $SiO_2/Al_2O_3$ and $Na_2O$ as described in numerous U.S. Patents including U.S. Pat. No. 3,130,007. The $SiO_2/Al_2O_3$ mole ratio of these materials varies from 3 to 6. The NaY useful in our process has a $SiO_2/Al_2O_3$ ratio of 4.5 to 5.5 or more.

The NaY is vigorously ion exchanged to provide an ammonium exchanged zeolite designated $NH_4NaY$ that contains about 1 to 4% $Na_2O$. I prefer 1.5 to 3% $Na_2O$.

The $NH_4NaY$ zeolite is steam calcined under conditions that deammoniate the material and provide a hydrogen Y zeolite (HY) that still contains the 1 to 4% $Na_2O$. The calcination is carried out at 900° to 1300° F. for 0.5 to 2 hours at a partial pressure of steam of 0.2 to 1 atmospheres.

The HY zeolite is then ion exchanged with a solution containing ammonium salts to remove nearly all of the remaining sodium. This material (USY) is contacted with a solution containing an aluminum salt such as $Al(NO_3)_3$. The degree of aluminum ion exchange into the zeolite is about 50 to 90% on an equivalent basis. The aluminum exchanged USY is then steam calcined to provide a Y zeolite that contains aluminum and some hydrogen ions. The degree of aluminum exchange, the calcination temperature, the amount of moisture present and the time of the calcination must be controlled to provide a material that has an $a_o$ of 24.31 to 24.35 Å. The temperature can be between 1100° and 1300° F. The time can be 0.5 to 2 hours, and the partial pressure of steam can be 0.5 to 1.0 atmosphere. In general, the $a_o$ value realized is inversely proportional to the degree of aluminum exchange, the temperature, partial pressure of steam and duration of the calcination. In effect, highly exchanged zeolite must be calcined under lower temperatures and/or for shorter times to provide the needed $a_o$ between 24.31 and 24.35 Å. Zeolite with lower aluminum substitution can be processed at higher temperature for longer periods.

This steam calcined material is now treated with a strong mineral acid that removes aluminum from the zeolite to provide our novel product of high $SiO_2/Al_2O_3$ ratio with an $a_o$ of 24.09 to 24.14 Å. The $a_o$ value realized in our product is inversely proportional to the $a_o$ value of the intermediate material; i.e., the 24.09 Å material being produced from a 24.34 or 24.35 Å intermediate. Washing and drying completes the preparation of our stable dealuminated Y zeolite of very low $a_o$ value.

The acid treatment is carried out with at least 1 normal (N) acid at 90° to 100° C. for 1 to 5 hours. Sufficient acid must be used to provide at least 20 $meqH^{30}/g$ of zeolite to achieve $a_o$ values of less than 20.14 Å. I prefer at least 30 $meqH^{30}/g$ of zeolite.

Our product is a stabilized zeolite Y with a $SiO_2/Al_2O_3$ ratio of about 40 to 70, a surface area of 700 to 900 $m^2/g$ and an $a_o$ value of 24.09 to 24.14 Å. It is useful as a support for various hydrocarbon conversion catalysts, especially hydrogenation of aromatics.

EXAMPLES

The following examples illustrate certain embodiments of our invention. These examples are not provided to establish the scope of the invention, which is described in the disclosure and recited in the claims. The proportions are in parts by weight (pbw), percent by weight (%) or parts per million (ppm) unless otherwise indicated. The unit cell constant ($a_o$) is determined as described in ASTM method D3942-80 entitled "Determination of Unit Cell Dimension of a Faujasite-type Zeolite." The % crystallinity is determined by comparing x-ray data of the modified zeolite with the same data for zeolite NaY.

The zeolite Y used in the process of our invention had 5.4 moles of $SiO_2$ for each mole of $Al_2O_3$, 13.3% $Na_2O$ and an $a_o$ of 24.66 Å. This material was converted to $NH_4NaY$ by ion exchange with a solution of $NH_4NO_3$ under conditions to produce a $Na_2O$ value of 2.5%. The $NH_4NaY$ was steam calcined at 1300° F. for one hour at a partial pressure of steam of 0.2 atmospheres. This treatment deammoniates the material and produces HNaY. Nearly all of the remaining sodium is removed by ion exchange with a solution of $NH_4NO_3$ to provide USY with 0.2% $Na_2O$ and an a value of 24.56 Å. This USY material was used for further treatment.

EXAMPLE 1

Steam Calcination of Aluminum Exchanged USY

Various samples of USY were ion exchanged with $Al(NO_3)_3$ solutions under conditions to provide various levels of aluminum exchange. These samples were calcined at 1300° F. and a partial pressure of steam of 0.8 atmospheres for 1, 2 or 3 hours. The results are summarized in the following table.

TABLE 1

| Sample # | $Al^{+3}$ Exchange (%) | Time (hrs) | $a_o$ (Å) |
|---|---|---|---|
| 1 | 0 | 1 | 24.38 |
| 2 | 67 | 1 | 24.36 |
| 3 | 67 | 2 | 24.35 |
| 4 | 67 | 3 | 24.33 |
| 5 | 93 | 2 | 24.34 |
| 6 | 95 | 1 | 24.32 |
| 7 | 95 | 2 | 24.30 |
| 8 | 95 | 3 | 24.29 |

The runs with samples 3, 4, 5 and 6 provide materials with the $a_o$ values required to produce the product of our invention. The remaining runs provide materials with $a_o$ values that are too large or too small.

EXAMPLE 2

Acid Treatment of a Product of Example 1

The product of the run using sample 5 of Example 1 was treated with 1.5 N $HNO_3$ for 3 hours at 93° C. in a single contact. The proportions of zeolite and acid were such that there were 36 meq of $H^+$ for each g of zeolite. The resulting product of our invention had a $SiO_2/Al_2O_3$ ratio of 55, 0.058% $Na_2O$, an $a_o$ value of 24.10 Å and a surface area of 743 m$^2$/g.

EXAMPLE 3

Acid Treatment of a Product of Example 1

The product of the run using Sample 7 of Example 1 was treated with $HNO_3$ of various normalities for 3 hours at 93° C.

The results are summarized in the following table.

TABLE 2

| $HNO_3$(N) | MeqH$^+$/g zeolite | Product $SiO_2/AlO_3$ | $a_o$ (Å) |
|---|---|---|---|
| 2 | 12 | 46 | 24.19 |

TABLE 2-continued

| $HNO_3$(N) | MeqH$^+$/g zeolite | Product $SiO_2/AlO_3$ | $a_o$ (Å) |
|---|---|---|---|
| 6 | 31 | 47 | 24.18 |
| 8 | 40 | 48 | 24.20 |
| 12 | 56 | 44 | 24.21 |

The products are not as described by our invention because the $a_o$ of the starting zeolite was 24.30 Å and outside the range required by the process of our invention.

EXAMPLE 4

Acid Treatment of Various Products Prepared as Described in Example 1

A group of zeolites was aluminum exchanged and steam calcined as described in Example 1. They were acid treated as described in example 2. The $a_o$ of these intermediate and product zeolites are compared in the following table.

TABLE 3

| $a_o$ of Steam Calcined $Al^{+3}$ exchanged USY (Å) | $a_o$ of Acid Treated Product (Å) |
|---|---|
| 24.28 | 24.21 |
| 24.29 | 24.17 |
| 24.30 | 24.16 |
| 24.31 | 24.13 |
| 24.32 | 24.14 |
| 24.34 | 24.10 |
| 24.34 | 24.09 |

These results indicate that only the zeolites in the range recited, 24.31 to 24.35 Å, can be acid treated to provide the product of our invention, an HY zeolite with an $a_o$ of less than 24.14 Å.

We claim:

1. A stabilized dealuminated zeolite Y with 40 to 70 moles of $SiO_2$ for each mole of $Al_2O_3$, an $a_o$ value of 24.09 to 24.14 Å , and a surface area of 700 to 900 m$^2$/g.

2. The process of preparing a stabilized dealuminated zeolite Y with 40 to 70 moles of $SiO_2$ for each mole of $Al_2O_3$, an $a_o$ value of 24.09 to 24.14 Å and a surface area of 700 to 900 m$^2$/g, prepared by the steps of:
   a. contacting a USY zeolite with a solution that contains aluminum ions ($Al^{+3}$) so that at least 50% of the zeolitic ion exchange sites are occupied by aluminum ions;
   b. steam calcining the aluminum exchanged zeolite;
   c. treating the resulting intermediate zeolite with a strong acid of at least 1 normal at 90° to 100° C. for 1 to 5 hours to produce the product zeolite; and
   d. washing and drying the product zeolite, the conditions of the steam calcination of step b. being such that the resulting intermediate zeolite has an $a_o$ value between 24.31 and 24.35 Å.

3. The process of claim 2 wherein the steam calcination conditions of step b. are 1100° to 1300° F., 0.5 to 2 hours and a partial pressure of steam of 0.5 to 1.0 atmospheres.

4. A zeolite prepared by the process of claim 2.

5. A zeolite prepared by the process of claim 3.

* * * * *